US012330371B2

(12) United States Patent
Binek et al.

(10) Patent No.: US 12,330,371 B2
(45) Date of Patent: Jun. 17, 2025

(54) ROTATING RELATIVE RECOATER AND PART ORIENTATION

(71) Applicant: Hamilton Sundstrand Corporation, Charlotte, NC (US)

(72) Inventors: Lawrence Binek, Glastonbury, CT (US); David W. Morganson, Marlborough, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 67 days.

(21) Appl. No.: 18/144,002

(22) Filed: May 5, 2023

(65) Prior Publication Data

US 2023/0330932 A1    Oct. 19, 2023

Related U.S. Application Data

(60) Continuation-in-part of application No. 17/724,183, filed on Apr. 19, 2022, which is a division of
(Continued)

(51) Int. Cl.
*B29C 64/241* (2017.01)
*B22F 10/28* (2021.01)
(Continued)

(52) U.S. Cl.
CPC ............ *B29C 64/241* (2017.08); *B22F 10/28* (2021.01); *B22F 10/32* (2021.01); *B22F 10/38* (2021.01);
(Continued)

(58) Field of Classification Search
CPC ... B29C 64/153; B29C 64/393; B29C 64/241; B22F 10/85
(Continued)

(56) References Cited

U.S. PATENT DOCUMENTS

| 8,021,138 B2 | 9/2011 | Green |
| 2007/0004028 A1 | 1/2007 | Lair et al. |

(Continued)

FOREIGN PATENT DOCUMENTS

| WO | 2019/139561 A1 | 7/2019 |
| WO | 2022/192368 A1 | 9/2022 |

OTHER PUBLICATIONS

Extended European Search Report for European Patent Application No. EP19204328.9, dated Apr. 1, 2020.
(Continued)

*Primary Examiner* — S. Behrooz Ghorishi
*Assistant Examiner* — Gregory C. Grosso
(74) *Attorney, Agent, or Firm* — Bachman & LaPointe, P.C.

(57) ABSTRACT

In accordance with at least one aspect of this disclosure, a method can include selectively sintering at least a portion of a part and one or more indexing features onto a build plate disposed in a build area of a feedstock powder bed, determining an actual orientation of the part and the build plate relative to a recoater prior to recoating, storing the actual orientation of the part and the build plate relative to the recoater, comparing the actual orientation of the part and the build plate relative to the recoater with a predicted orientation, and recoating the build area with feedstock powder if the actual orientation of the part and the build plate relative to the recoater matches the predicted orientation to achieve a predetermined build quality for a respective layer of the part.

17 Claims, 3 Drawing Sheets

Related U.S. Application Data application No. 16/166,958, filed on Oct. 22, 2018, now abandoned.

(51) Int. Cl.

| | | |
|---|---|---|
| *B22F 10/32* | (2021.01) | |
| *B22F 10/38* | (2021.01) | |
| *B22F 12/00* | (2021.01) | |
| *B22F 12/37* | (2021.01) | |
| *B22F 12/47* | (2021.01) | |
| *B22F 12/67* | (2021.01) | |
| *B22F 12/70* | (2021.01) | |
| *B29C 64/153* | (2017.01) | |
| *B29C 64/255* | (2017.01) | |
| *B29C 64/268* | (2017.01) | |
| *B29C 64/321* | (2017.01) | |
| *B29C 64/393* | (2017.01) | |
| *B33Y 10/00* | (2015.01) | |
| *B33Y 30/00* | (2015.01) | |
| *B33Y 40/00* | (2020.01) | |

(52) U.S. Cl.
CPC ............ *B22F 12/226* (2021.01); *B22F 12/37* (2021.01); *B22F 12/47* (2021.01); *B22F 12/67* (2021.01); *B22F 12/70* (2021.01); *B29C 64/153* (2017.08); *B29C 64/255* (2017.08); *B29C 64/268* (2017.08); *B29C 64/321* (2017.08); *B29C 64/393* (2017.08); *B33Y 10/00* (2014.12); *B33Y 30/00* (2014.12); *B33Y 40/00* (2014.12)

(58) Field of Classification Search
USPC ........................................................ 264/497
See application file for complete search history.

(56) References Cited

U.S. PATENT DOCUMENTS

| | | |
|---|---|---|
| 2010/0125356 A1 | 5/2010 | Shkolnik et al. |
| 2011/0297081 A1 | 12/2011 | Green |
| 2018/0001553 A1 | 1/2018 | Buller et al. |
| 2018/0099332 A1 | 4/2018 | Shaw |
| 2018/0186082 A1* | 7/2018 | Randhawa ............ B33Y 50/02 |
| 2018/0200963 A1 | 7/2018 | Bogdan, Jr. et al. |
| 2018/0345582 A1* | 12/2018 | Schade .................. B22F 12/67 |
| 2019/0009333 A1 | 1/2019 | Fasano |
| 2019/0099809 A1* | 4/2019 | Hellestam ............ B29C 64/241 |
| 2019/0314894 A1 | 10/2019 | Pan |
| 2019/0323951 A1 | 10/2019 | Gold et al. |
| 2020/0016655 A1 | 1/2020 | Crump et al. |
| 2020/0122389 A1 | 4/2020 | Binek et al. |
| 2021/0331399 A1 | 10/2021 | Seita et al. |

OTHER PUBLICATIONS

European Search Reported dated Sep. 17, 2024 for European Patent Application No. 24174167.7.

* cited by examiner

ROTATING RELATIVE RECOATER AND PART ORIENTATION

CROSS REFERENCE TO RELATED APPLICATIONS

This application is a Continuation-in-Part of U.S. patent application Ser. No. 17/724,183, filed on Oct. 16, 2018, which is a divisional of U.S. patent application Ser. No. 16/166,958, filed Oct. 22, 2018.

BACKGROUND OF THE INVENTION

1. Field of the Invention

The present disclosure relates to additive manufacturing, and more particularly to controlling geometries in additive manufacturing techniques such as laser powder bed fusion, electron beam additive manufacturing, and the like.

2. Description of Related Art

Laser powder bed fusion additive manufacturing and electron beam additive manufacturing use directed energy in conjunction with powder feedstock to form a sintered structure. The energy source, e.g., the laser beam or electron beam, excites the target material to the point of phase-change. This melt-pool process, coupled with an active toolpath effectively welds a single layer of powder feedstock into a solid state. Once one layer has been formed, a recoater pushes a thin layer of powder feedstock across the build surface and the process repeats.

Build quality is often dependent on the orientation of the part with respect to the recoater. Due to the movement of the recoater over recently fused layers of the build, the properties of the part build can be negatively affected by part orientation. The part is traditionally positioned on a build plate in such a way as to avoid risk of recoater crash during the additive manufacturing process. Certain geometries are very sensitive to recoater orientation relative to the part. As such, part designs have to be developed knowing that certain features may build poorly and this limits the design space.

The conventional techniques have been considered satisfactory for their intended purpose. However, there is an ever present need for improved additive manufacturing systems and methods. This disclosure provides a solution for this need.

SUMMARY OF THE INVENTION

A system for additive manufacturing includes a build chamber including a sidewall and a build plate cooperating to define a build volume, wherein the build chamber is configured to house a part and unfused feedstock powder during a build. An energy source is mounted for movement relative to the build chamber, wherein the energy source is configured to selectively sinter the feedstock powder. A recoater is mounted for movement relative to the build chamber, wherein the recoater is configured to deposit successive layers of the feedstock powder for sintering to the part. A rotational actuator is in operable communication with the build chamber and the recoater configured to rotate the build chamber relative to the recoater.

A gas flow manifold can be operatively connected to a machine body for controlling gas composition in the build chamber, wherein the rotational actuator is configured to rotate the build chamber relative to the gas flow manifold and relative to the machine body. A linear actuator can be configured to move the build plate relative to the sidewall of the build chamber. The linear actuator and the rotary actuator can each include a respective encoder, wherein the encoders are operatively connected to index part location and rotation to provide clearance between the part and the recoater for rotation of the build chamber. The rotational actuator can include an encoder configured to index rotational part position, wherein an index value from the encoder is used to confirm approach angle of the recoater. A controller can be operatively connected to the energy source, to the recoater, and to the rotational actuator for controlling additive manufacturing of a part in the build chamber, wherein the controller is configured to select an approach angle on a layer by layer basis for the recoater relative to a build in the build chamber. The approach angle for each layer can be selected based on which approach angles provide a predetermined build quality.

The recoater can a soft recoater which is configured to not make contact with a part in the build chamber during a build. The controller can be configured to select an approach angle on a layer by layer basis to reduce or eliminate ripples forming in the part due to interactions between the recoater and a melt pool formed in the part as the energy source sinters feedstock powder to the part. The controller can be configured to select an approach angle on a layer by layer basis to reduce or eliminate cumulative build errors forming in the part due to interactions between the recoater and a melt pool formed in the part as the energy source sinters feedstock powder to the part.

The build plate and the sidewall of the build chamber can be configured to rotate together with a part during a build in the build chamber, and to rotate the part and unfused feedstock powder together in the build chamber to avoid relative rotation of the part and unfused feedstock powder, e.g., so the feedstock powder in the build chamber remains undisturbed. The rotational actuator can be configured to rotate the build chamber clockwise and counter-clockwise. The build plate can have a non-circular shape, and the sidewall of the build chamber can conform to the non-circular shape.

A method of additive manufacturing includes depositing feedstock powder with a recoater in a build chamber, selectively sintering a portion of the feedstock powder deposited by the recoater to a part in the build chamber, rotating the part, the build chamber, and unsintered feedstock powder in the build chamber together relative to the recoater, and repeating the depositing, the selectively sintering, and the rotating to form an additively manufactured part layer by layer in the build chamber.

The method includes controlling gas composition in the build chamber using a gas flow manifold, wherein the rotational actuator is configured to rotate the build chamber relative to the gas flow manifold. The method includes indexing part location and rotation to provide clearance between the recoater and the part for rotation of the build chamber. The method includes using an index value from an encoder to confirm approach angle of the recoater. The method includes selecting an approach angle on a layer by layer basis for the recoater relative to a build in the build chamber, wherein the approach angle for each layer is selected based on which approach angles provide a predetermined build quality.

The recoater can be a soft recoater and the method can include avoiding contact between the soft recoater with a part in the build chamber during a build, wherein avoiding contact includes selecting an approach angle on a layer by layer basis to reduce or eliminate ripples forming in the part due to interactions between the recoater and a melt pool formed in sintering feedstock powder to the part. The method can include selecting an approach angle on a layer by layer basis to reduce or eliminate cumulative build errors forming in the part due to interactions between the recoater and a melt pool formed in the part in sintering feedstock powder to the part.

Rotating the part, the build chamber, and unsintered feedstock can include rotating the part and unfused feedstock powder together to avoid relative rotation of the part and unfused feedstock powder, e.g., so the feedstock powder in the build chamber remains undisturbed. Rotating the part, the build chamber, and unsintered feedstock can include rotating the build chamber clockwise and counter-clockwise.

In accordance with at least one aspect of this disclosure, a method of additive manufacturing can include selectively sintering at least a portion of a part and one or more indexing features onto a build plate disposed in a build area of a feedstock powder bed; determining, using the one or more indexing features, an actual orientation of the part and the build plate relative to a recoater prior to recoating, storing the actual orientation of the part and the build plate relative to the recoater in a memory; comparing the actual orientation of the part and the build plate relative to the recoater with a predicted orientation of the part and the build plate relative to the recoater; and recoating the build area with feedstock powder if the actual orientation of the part and the build plate relative to the recoater matches the predicted orientation of the part and the build plate relative to the recoater or if a difference between the actual and predicted orientation of the part and the build plate relative to the recoater is within a predetermined error threshold to achieve a predetermined build quality for a respective layer of the part.

In embodiments, the predicted orientation can include an angle θ defined between an axis of travel of the recoater and an axis defined by a portion of the part standing proud of the build surface, the axis of the portion of the part defined on a side of the portion of the part longer than all surrounding portions of the part. The angle θ can be an angle most favorable based on a calculated average of all possible angles θ for the given layer to achieve the predetermined build quality for the given layer of the part. In certain embodiments, the angle θ can be between 45 degrees and 90 degrees.

In embodiments, if the actual orientation of the part and the build plate relative to the recoater matches the predicted orientation of the part and the build plate relative to the recoater or a difference between the actual and predicted orientation of the part and the build plate relative to the recoater is within a predetermined error threshold, the method can further include, after recoating, selectively sintering a portion of the feedstock powder deposited by the recoater to the part. In embodiments, the method can further include rotating the part and the build plate to the predicted orientation relative to the recoater for successive layers to additively manufacture the part on the build plate. In embodiments, the method can further include, recoating the build area with feedstock powder after rotating the part to the predicted orientation and selectively sintering the feedstock powder to the part after recoating the build area. In certain embodiments, the predicted orientation of the part and the build plate relative to the recoater can be determined at least in part by a relative shape of the part for a respective build layer.

In embodiments, if the actual orientation of the part and the build plate relative to the recoater does not match the predicted orientation of the part and the build plate relative to the recoater and the difference between the actual and predicted orientation of the part and the build plate relative to the recoater exceeds the error threshold, the method can further include rotating the build plate and part together to change the orientation relative to the recoater such that the difference between the actual and the predicted orientation of the part and the build plate relative to the recoater is at least within the error threshold. In embodiments, the method can further include, recoating the build area with feedstock powder after rotating the part to the predicted orientation and selectively sintering the feedstock powder to the part after recoating the build area The method can further include iteratively repeating rotating the build plate and the part together to change the actual orientation relative to the recoater until the difference between the actual and the predicted orientation of the part and the build plate relative to the recoater is at least within the error threshold.

In embodiments, the predicted orientation of the part and the build plate relative to the recoater can be determined at least in part by a relative shape of the part at each respective layer of the part. In certain embodiments, the method can include, receiving, from build instructions, an approach angle for the respective layer, and rotating the build plate to achieve the approach angle so that the actual orientation matches the predicted orientation. In certain embodiments, the method can include calculating an approach angle for the respective layer, wherein calculating includes, calculating an average of all possible approach angles for the respective layer to achieve the predetermined build quality for the given layer of the part, and rotating the build plate to achieve the approach angle so that the actual orientation matches the predicted orientation.

In embodiments, the orientation of the part and the build plate relative to the recoater can be selected on a layer by layer basis such that the approach angle of the recoater for each respective layer can be configured to provide the predetermined build quality.

In embodiments, determining can include imaging the build area before and after each rotation of the part to determine whether the orientation of the part and the build plate relative to the recoater is correct based at least in part on a relative location of the one or more indexing features.

In certain embodiments, selectively sintering the one or more indexing features on the build plate can include selectively sintering an alphanumeric and/or graphical index and one or more non-symmetric structures at or near an outer circumference of the build plate and remote from the part such that the index and non-symmetric structures are not included in the part.

In accordance with at least one aspect of this disclosure, a system for additive manufacturing can include a build chamber which includes a sidewall and a build plate cooperating to define a build volume. The build chamber can be configured to house a part and unfused feedstock powder during a build. The system can further include an energy source mounted for movement relative to the build chamber. The energy source can be configured to selectively sinter the feedstock powder. In embodiments, the system can include a recoater mounted for movement relative to the build chamber. The recoater can be configured to deposit successive layers of the feedstock powder for sintering to the part. In embodiments, the system can further include a rotational actuator in operable communication with the build chamber and the recoater configured to rotate the build chamber relative to the recoater and a controller operatively connected to control the rotational actuator to rotate the part and the build chamber based on an orientation of the part relative to the recoater.

In embodiments, the system of claim can further include an imaging system configured to image the build chamber. The imaging system can be operatively connected to the controller to provide image data to the controller. In embodiments, the controller can be configured to control the rotational actuator to rotate the build chamber based at least in part on the image data. In certain embodiments, the controller can further include a logic module configured to cause the controller to operate the system to perform a method, e.g., any one or more embodiments of the methods described herein.

In accordance with at least one aspect of this disclosure, an additively manufactured article is provided, which can have improved build quality when produced by any one or more embodiments of the processes described herein.

In accordance with at least one aspect of this disclosure, a non-transitory computer readable medium can have computer executable instructions stored therein and the computer executable instructions can be configured to cause a computer to perform a method. In embodiments, the method can include controlling the rotational actuator to rotate a part and a build chamber of an additive manufacturing machine based on an orientation of the part relative to the recoater to additively manufacture a part having a predetermined build quality. In embodiments, the method can be any one or more embodiments of the methods described herein. In certain embodiments, the orientation of the part can be selected on a layer by layer basis and based on a shape of a respective layer as defined by build instructions stored in the medium.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
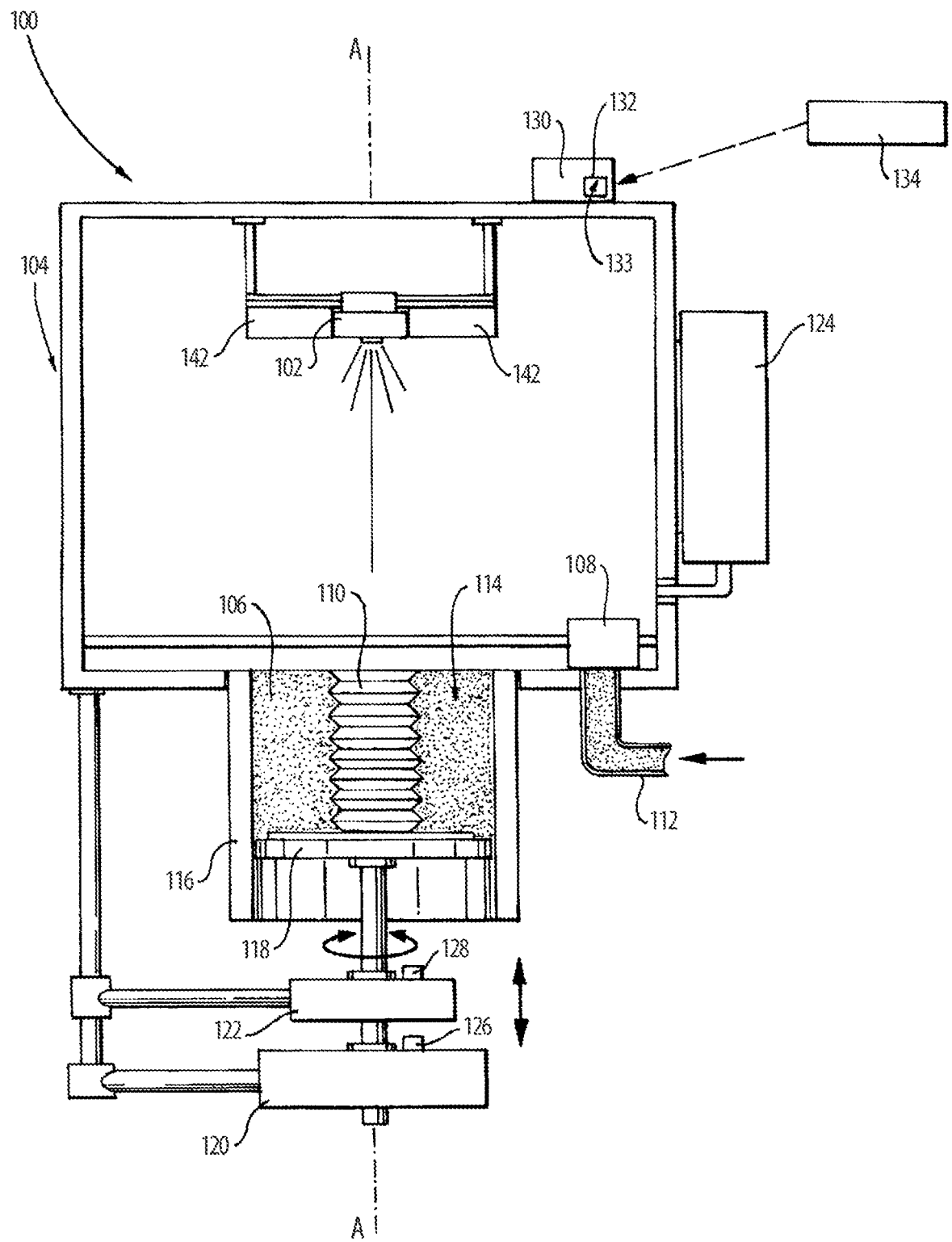
FIG. 1 is a schematic side elevation view of an exemplary embodiment of a system constructed in accordance with the present disclosure, showing a build in process within the build chamber.

Reference will now be made to the drawings wherein like reference numerals identify similar structural features or aspects of the subject disclosure. For purposes of explanation and illustration, and not limitation, a partial view of an exemplary embodiment of a system for additive manufacturing in accordance with the disclosure is shown in FIG. 1 and is designated generally by reference character 100.

Other embodiments of systems in accordance with the disclosure, or aspects thereof, are provided in FIGS. 2-3, as will be described. The systems and methods described herein can be used to control build quality and reduce cumulative build errors in additive manufacturing.

The system 100 includes an energy source 102, e.g., a laser, electron beam, or any other suitable directed source of sintering energy, mounted for movement, e.g., linear or curved movement, relative to a machine body 104, e.g., two-dimensional movement left and right and into and out of the viewing plane as oriented in FIG. 1. The energy source 105 is configured to selectively sinter feedstock powder 106. A recoater 108 is mounted for movement, e.g., linear movement, relative to the machine body, e.g. for movement left and right as oriented in FIG. 1. The recoater 108 is configured to deposit successive layers of feedstock powder 106 for sintering to a part 110, e.g., by sweeping a thin layer of feedstock powder from a dosing chamber 112 over the top of part 110 and the feedstock powder 106 in the build chamber 114 after each layer of the part 110 is sintered. The build chamber 114 includes a sidewall 116 and a build plate 118 cooperating with one another to define a build volume, e.g., the volume that is filled with feedstock powder 106 and the part 110 in FIG. 1. The build chamber 114 houses the part 110 and the unfused feedstock powder 106 during a build. After each layer of part 110 is sintered, a linear actuator 120 lowers the build plate 118, the unfused feedstock powder 106, and the part 110 slightly to create a clearance at the top of the part 110 for recoater 108 to deposit the next layer of feedstock powder over the part 110 for sintering the next layer of the part 110. The movement direction of the build plate 118 is indicated by the vertical double arrow in FIG. 1. The linear actuator 120 is configured to move the build plate 118 relative to the sidewall 116 of the build chamber 114.

A rotational actuator 122 operatively connects between the machine body 104 and the build chamber 114 for rotating the build chamber 114 relative to the machine body 104 and recoater 108. The direction of rotation of the build chamber 114 due to the rotational actuator 122 is about the axis A and is indicated schematically in FIG. 1 by the circular double arrow, wherein the axis A aligned to the build direction, i.e., the axis A is aligned with the direction in which the part 110 grows layer by layer during the build. As depicted in FIG. 1, the linear actuator 120 lifts or lowers the rotary actuator together with the build plate, however it also contemplated that mechanical order could be different, e.g., wherein the rotational actuator 122 rotates the linear actuator together with rotating the build chamber 114. A gas flow manifold 124 is operatively connected to the machine body 104 for controlling gas composition in the build chamber 114. The rotational actuator 122 is configured to rotate the build chamber 114 relative to the gas flow manifold 124.

The linear actuator 120 and the rotary actuator 122 each include a respective encoder 126, 128. The encoders 126, 128 are operatively connected to index part location and rotation of the part 110, e.g. relative to the machine body 104 and recoater 108, to provide clearance between the part 110 and the recoater 108 for rotation of the build chamber 114 relative to the recoater 108. The encoder 128 of the rotational actuator 122 is configured to index rotational part position of the build chamber 114 and the part 110, wherein an index value from the encoder 128 is used to confirm approach angle θ of the recoater (the approach angle θ is identified in FIGS. 2-3). A controller 130 is operatively connected to the energy source 102, to the recoater 108, to the gas flow manifold 124, to the linear actuator 120, to the encoders 126, 128, and to the rotational actuator 122 for controlling additive manufacturing of the part 110 in the build chamber 114.

Figure 2:
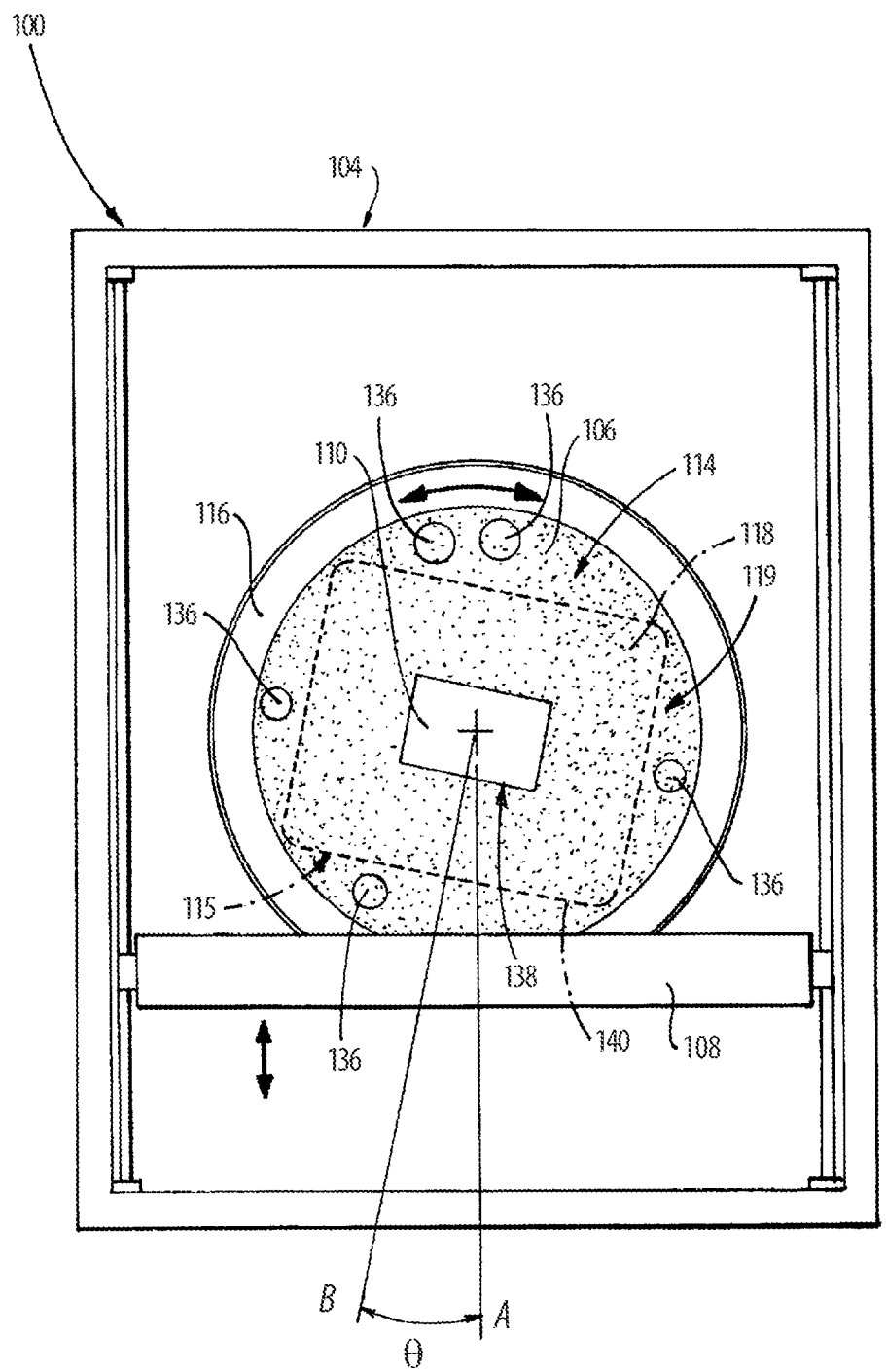
FIG. 2 is a schematic plan view of a portion of the system of FIG. 1, showing one approach angle of the recoater.
Figure 3:
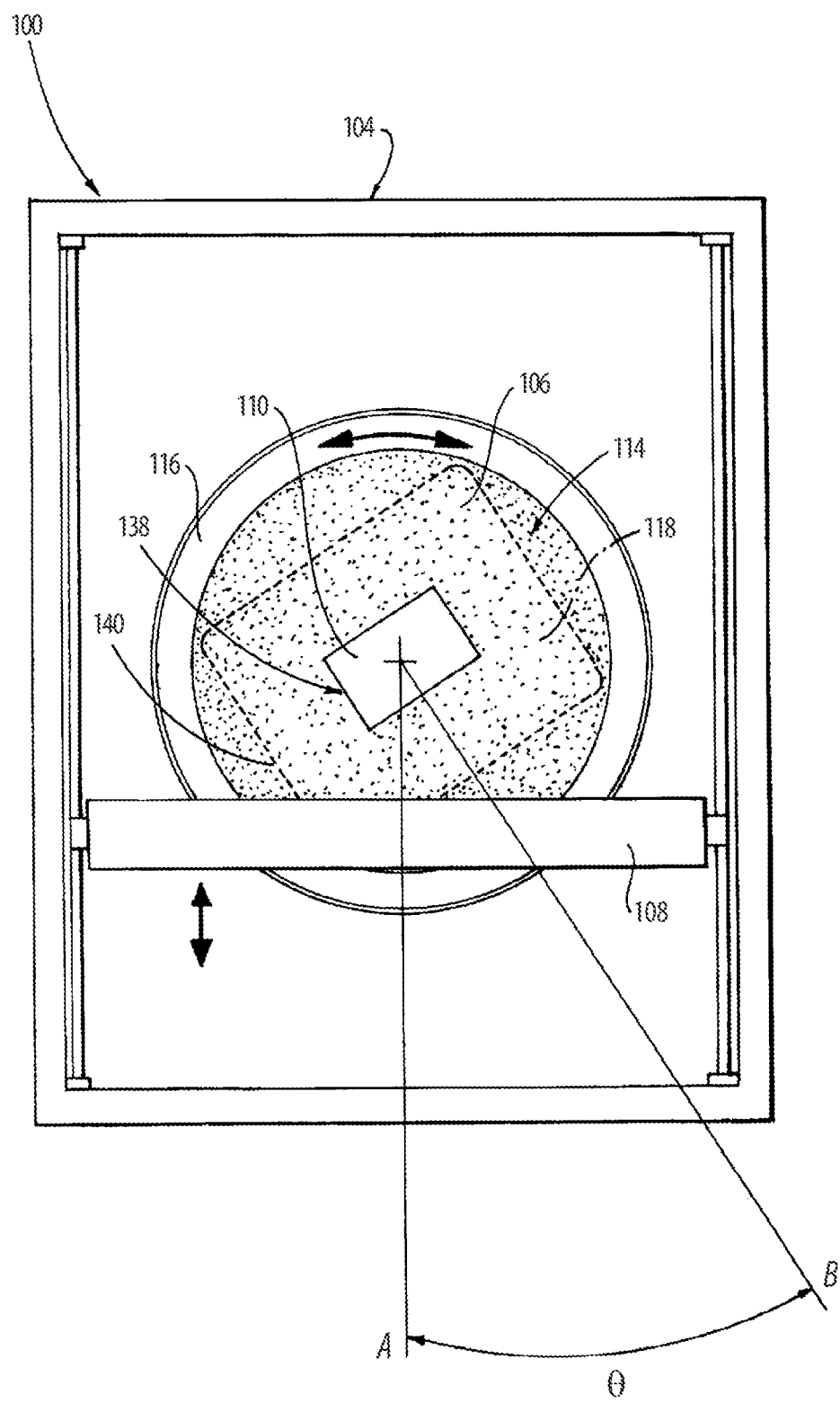
FIG. 3 is a schematic plan view of a portion of the system of FIG. 1, showing another approach angle of the recoater.

With reference to FIGS. 2-3 the controller 130 (shown in FIG. 1) is configured, e.g., with machine readable instructions that cause the controller 130 to select an approach angle θ on a layer by layer basis for the recoater 108 relative to a build or part 110 in the build chamber 114. The approach angle θ for each layer of the part 110 is selected based on which approach angles provide a predetermined build quality for the part 110. For example, at each layer of the part 110, the approach angle θ for the part 110 relative to the recoater 108 can be selected to minimize cumulative build errors that would otherwise result from having a constant relative orientation of the part 110 to the recoater 108. As shown in FIG. 1, the controller 130 can control the rotational actuator 122 to rotate the build chamber 114 and the part 110 to the given approach angle θ (shown in FIGS. 2-3) at a given layer of the part 110 before the recoater 108 deposits the next layer of feedstock powder 106.

With continued reference to FIGS. 1-3, the recoater 108 is a soft recoater which is configured to not make contact with the part 110 in the build chamber 114 during a build. The controller 128 can be configured, e.g., with a build quality algorithm in machine readable instructions, to select the approach angle θ on a layer by layer basis for the part 110 to reduce or eliminate ripples forming in the part 110 due to interactions between the recoater 108 and a melt pool formed in the part 110 as the energy source 102 sinters feedstock powder 106 to the part 110. It is also contemplated that the controller 128 can be configured, e.g., with a build quality algorithm in machine readable instructions, to select an approach angle θ on a layer by layer basis for the part 110 to reduce or eliminate cumulative build errors forming in the part 110 due to interactions between the recoater 108 and the melt pool formed in the part 110 as the energy source 102 sinters feedstock powder 106 to the part 110.

With reference to FIGS. 2-3, the build plate 118 and the sidewall 116 of the build chamber 114 are configured to rotate together with the part 110 during a build in the build chamber 114. This rotates the part 110 and the unfused feedstock powder 106 in the build chamber 114 together to avoid relative rotation of the part 110 and the unfused feedstock powder 106, e.g., so the feedstock powder 106 in the build chamber 114 remains undisturbed during rotation. The rotational actuator 122 (shown in FIG. 1) is configured to rotate the build chamber 114 clockwise relative to the recoater 108 as shown in FIG. 3 and counter-clockwise relative to the recoater 108 as shown in FIG. 2, and the approach angle θ between the recoater 108 and the part 110 can be any angle from 0° to 360°. The build plate 118 has circular shape, but as shown in FIGS. 2 and 3 in the dotted lines, this is a rectangle with rounded corners, however, any suitable shape can be used without departing from the scope of this disclosure. The sidewall 116 of the build chamber 114 conforms to the shape of the build plate 118. If a circular build plate 118 is used, the build plate 118 and sidewall 116 can be mechanically registered to keep them from rotating relative to one another.

While disclosed herein in the exemplary context of having the build chamber 114 rotate relative to the machine body 104, those skilled in the art will readily appreciate that it is possible to rotate the recoater relative to the machine body 104 to change the approach angle of the recoater 108, without departing from the scope of this disclosure.

With reference to FIGS. 1-3, in accordance with at least one aspect of this disclosure, a method of additive manufacturing can include selectively sintering at least a portion of a part (e.g., part 110) and one or more indexing features (e.g., features 136) onto a build plate (e.g., build plate 118) disposed in a build area (e.g., build area 115 within chamber 114) of a feedstock powder bed (e.g., powder bed 119 within chamber 114). The method can include determining, using the one or more indexing features, an actual orientation of the part and the build plate relative to a recoater (e.g., recoater 108) prior to recoating the build area.

In embodiments, determining can include imaging the build area before and after each rotation of the part to determine whether the orientation of the part and the build relative to the recoater is correct based at least in part on a relative location of the one or more indexing features. In certain embodiments, selectively sintering the one or more indexing features 136 on the build plate can include selectively sintering an alphanumeric and/or graphical index and one or more non-symmetric structures at or near an outer circumference 137 of the build plate and remote from the part 110 such that the index and non-symmetric structures are not included in the part 110.

The method can include storing the actual orientation of the part and the build plate relative to the recoater in a memory (e.g., a memory 132 within controller 130) and comparing the actual orientation of the part and the build plate relative to the recoater with a predicted orientation of the part and the build plate relative to the recoater, for example as stored in the memory 134.

The method can then include recoating the build area with feedstock powder if the actual orientation of the part and the build plate relative to the recoater matches the predicted orientation of the part and the build plate relative to the recoater or if a difference between the actual and predicted orientation of the part and the build plate relative to the recoater is within a predetermined error threshold to achieve a predetermined build quality for a respective layer of the part. In certain embodiments, the error threshold can be about 5%.

In embodiments, the predicted orientation of the part and build plate relative to the recoater can include an angle θ defined between an axis of travel A of the recoater and an axis B. The axis be can be defined by a portion of the part standing proud of the build surface, the axis of the portion of the part defined on a side of the portion of the part longer than all surrounding portions of the part, for example side 138 as shown in FIGS. 2 and 3. For example and for the purpose of illustration and not limitation, as shown in FIGS. 2 and 3, the axis B can be defined by a long face 138 of the part, wherein the long face is parallel to an edge of 140 the build plate such that the axis B is perpendicular to the parallel edge of the build plate.

In certain embodiments, the angle θ can be an angle most favorable based on a calculated average of all possible angles θ for the given layer to achieve the predetermined build quality for the given layer of the part. In certain embodiments, the angle θ can be between 45 degrees and 90 degrees. In certain embodiments, the predicted orientation of the part and the build plate relative to the recoater can be determined at least in part by a relative shape of the part for a respective build layer, as discussed further below.

In embodiments, if the actual orientation of the part and the build plate relative to the recoater matches the predicted orientation of the part and the build plate relative to the recoater or a difference between the actual and predicted orientation of the part and the build plate relative to the recoater is within a predetermined error threshold, the method can include, recoating the build area, and then after recoating, selectively sintering a portion of the feedstock powder deposited by the recoater to the part. The method can then include rotating the part and the build plate to the predicted orientation relative to the recoater for successive layers to additively manufacture the part on the build plate, for example to build the part. The method can repeat, including determining the orientation of the part, rotating the part and build plate until the desired orientation is achieved, recoating the build area, and sintering, until the part is complete. Accordingly, in embodiments, the method can further include, recoating the build area with feedstock powder after rotating the part to the predicted orientation and selectively sintering the feedstock powder to the part after recoating the build area.

In embodiments, if the actual orientation of the part and the build plate relative to the recoater does not match the predicted orientation of the part and the build plate relative to the recoater and the difference between the actual and predicted orientation of the part and the build plate relative to the recoater exceeds the error threshold, the method can further include rotating the build plate and part together to change the orientation relative to the recoater such that the difference between the actual and the predicted orientation of the part and the build plate relative to the recoater is at least within the error threshold.

The method can further include iteratively repeating rotating the build plate and the part together to change the actual orientation relative to the recoater until the difference between the actual and the predicted orientation of the part and the build plate relative to the recoater is at least within the error threshold. Once the actual orientation matches the predicted orientation, or is within the error threshold, the method can include recoating the build area and sintering the feedstock to the part. The method can then continue as needed, rotating the part and the build plate to the predicted orientation relative to the recoater for successive layers to additively manufacture the part on the build plate, for example to build the part. The method can repeat, including determining the orientation of the part, rotating the part and build plate until the desired orientation is achieved, recoating the build area, and sintering, until the part is complete.

In embodiments, the predicted orientation of the part and the build plate relative to the recoater can be determined at least in part by a relative shape of the part at each respective layer of the part. In certain embodiments, the method can include, receiving, from build instructions (e.g., loaded into the memory 132 from an external source 134 such as a computer), an approach angle for the respective layer, and rotating the build plate to achieve the approach angle so that the actual orientation matches the predicted orientation.

In certain embodiments, the method can include calculating the approach angle θ for the respective layer. In such embodiments, no external source 134 may be needed to supply the approach angle, but instead, the controller 130 itself, e.g., using a logic module within the memory 132 can calculate the approach angle using the build instructions. In embodiments, calculating can include, calculating an average of all possible approach angles for the respective layer to achieve the predetermined build quality for the given layer of the part, and rotating the build plate to achieve the approach angle so that the actual orientation matches the predicted orientation. In embodiments, the orientation of the part and the build plate relative to the recoater can be selected on a layer by layer basis such that the approach angle of the recoater for each respective layer can be configured to provide the predetermined build quality.

In accordance with at least one aspect of this disclosure, a system (e.g., system 100) include an imaging system 142 configured to image the build chamber 114. The imaging system 142 can be operatively connected to the controller 130 to provide image data to the controller 130. In embodiments, the controller 130 can be configured to control the rotational actuator 122 to rotate the build chamber based at least in part on the image data. In certain embodiments, the controller 130 can further include a logic module (e.g., module 133, which can be stored in the memory 132 of the controller 130) configured to cause the controller to operate the system to perform a method, e.g., any one or more embodiments of the methods described herein.

In accordance with at least one aspect of this disclosure, an additively manufactured article 110 is provided, which can have improved build quality when produced by any one or more embodiments of the processes described herein.

In accordance with at least one aspect of this disclosure, a non-transitory computer readable medium (e.g., including or within the controller 130) can have computer executable instructions stored therein and the computer executable instructions can be configured to cause a computer to perform a method. In embodiments, the method can include controlling the rotational actuator to rotate a part and a build chamber of an additive manufacturing machine based on an orientation of the part relative to the recoater to additively manufacture a part having a predetermined build quality, e.g., as described above. In embodiments, the method can be any one or more embodiments of the methods described herein. In certain embodiments, the orientation of the part can be selected on a layer by layer basis and based on a shape of a respective layer as defined by build instructions stored in the medium.

The ability to rotate the part after each layer of feedstock powder is sintered to the part allows designers to avoid the traditional problems when the sintered melt pool pulling in more feedstock powder material than intended. Traditionally in soft recoater systems, this melt pool phenomenon in one layer causes ripples in the surfaces of parts, and the errors in the part can be cumulative as the part is built layer by layer. The ability to change the approach angle for the recoater on each layer can disrupt the ripple patterns and thus avoid cumulative errors. Since the powder and part can be rotated together, errors arising from disturbing the unsintered feedstock powder can be avoided. Potential advantages of systems and methods as disclosed herein include the following. By reducing build failure risk with respect to part orientation, additive manufacturing part designers can be enabled to develop more complex part designs. For example, heat exchangers with complex internal fins and passages can benefit from this capability, whereas with traditional techniques such builds would have a much higher risk of build failure. Embodiments can include any suitable computer hardware and/or software module(s) to perform any suitable function (e.g., as disclosed herein).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "controller." A "circuit," "module," or "controller" can include one or more portions of one or more separate physical hardware and/or software components that can together perform the disclosed function of the "circuit,"

"module," or "controller", or a "circuit," "module," or "controller" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

The methods and systems of the present disclosure, as described above and shown in the drawings, provide for additive with superior properties including improved build quality and reduced cumulative error relative to traditional techniques. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of additive manufacturing comprising:
selectively sintering at least a portion of a part and one or more indexing features onto a build plate disposed in a build area of a feedstock powder bed;
determining, using the one or more indexing features, an actual orientation of the part and the build plate relative to a recoater prior to recoating;
storing the actual orientation of the part and the build plate relative to the recoater in a memory;
comparing the actual orientation of the part and the build plate relative to the recoater with a predicted orientation of the part and the build plate relative to the recoater; and
recoating the build area with feedstock powder when the actual orientation of the part and the build plate relative to the recoater matches the predicted orientation of the part and the build plate relative to the recoater or when a difference between the actual and predicted orientation of the part and the build plate relative to the recoater is within a predetermined error threshold to achieve a predetermined build quality for a respective layer of the part, wherein:
when the actual orientation of the part and the build plate relative to the recoater matches the predicted orientation of the part and the build plate relative to the recoater or a difference between the actual and predicted orientation of the part and the build plate relative to the recoater is within a predetermined error threshold:

after recoating, selectively sintering a portion of the feedstock powder deposited by the recoater to the part; and when the actual orientation of the part and the build plate relative to the recoater does not match the predicted orientation of the part and the build plate relative to the recoater and the difference between the actual and predicted orientation of the part and the build plate relative to the recoater exceeds the error threshold:

rotating the build plate and part together to change the orientation relative to the recoater such that the difference between the actual and the predicted orientation of the part and the build plate relative to the recoater is at least within the error threshold;

recoating the build area with feedstock powder after rotating the part to the predicted orientation; and selectively sintering the feedstock powder to the part after recoating the build area.

2. The method of claim 1, wherein the predicted orientation includes an angle θ defined between an axis of travel of the recoater and an axis defined by a portion of the part standing proud of the build surface, the axis of the portion of the part defined on a side of the portion of the part longer than all surrounding portions of the part.

3. The method as recited in claim 2, wherein the angle θ is an angle most favorable based on a calculated average of all possible angles θ for the given layer to achieve the predetermined build quality for the given layer of the part.

4. The method of claim 2, wherein the angle θ is between 45 degrees and 90 degrees.

5. The method of claim 1 further comprising:

rotating the part and the build plate to the predicted orientation relative to the recoater for successive layers to additively manufacture the part on the build plate, wherein the predicted orientation of the part and the build plate relative to the recoater is determined at least in part by a relative shape of the part for a respective build layer;

recoating the build area with feedstock powder after rotating the part to the predicted orientation; and selectively sintering the feedstock powder to the part after recoating the build area.

6. The method of claim 1 further comprising iteratively repeating rotating the build plate and the part together to change the actual orientation relative to the recoater until the difference between the actual and the predicted orientation of the part and the build plate relative to the recoater is at least within the error threshold.

7. The method of claim 1, wherein the predicted orientation of the part and the build plate relative to the recoater is determined at least in part by a relative shape of the part at each respective layer of the part, the method further comprising:

receiving, from build instructions, an approach angle for the respective layer; and rotating the build plate to achieve the approach angle so that the actual orientation matches the predicted orientation.

8. The method of claim 1, wherein the predicted orientation of the part and the build plate relative to the recoater is determined at least in part by a relative shape of the part at each respective layer of the part, the method further comprising:

calculating an approach angle for the respective layer, wherein calculating includes, calculating an average of all possible approach angles for the respective layer to achieve the predetermined build quality for the given layer of the part; and rotating the build plate to achieve the approach angle so that the actual orientation matches the predicted orientation.

9. The method of claim 7, wherein the orientation of the part and the build plate relative to the recoater is selected on a layer by layer basis such that the approach angle of the recoater for each respective layer is configured to provide the predetermined build quality.

10. The method of claim 1, wherein determining includes imaging the build area before and after each rotation of the part to determine whether the orientation of the part and the build relative to the recoater is correct based at least in part on a relative location of the one or more indexing features.

11. The method of claim 10, wherein selectively sintering the one or more indexing features on the build plate includes selectively sintering an alphanumeric and/or graphical index and one or more non-symmetric structures at or near an outer circumference of the build plate and remote from the part such that the index and non-symmetric structures are not included in the part.

12. A system for additive manufacturing comprising:

a build chamber including a sidewall and a build plate cooperating to define a build volume, wherein the build chamber is configured to house a part and unfused feedstock powder during a build;

an energy source mounted for movement relative to the build chamber, wherein the energy source is configured to selectively sinter the feedstock powder;

a recoater mounted for movement relative to the build chamber, wherein the recoater is configured to deposit successive layers of the feedstock powder for sintering to the part;

a rotational actuator in operable communication with the build chamber and the recoater configured to rotate the build chamber relative to the recoater; and a controller operatively connected to control the rotational actuator to rotate the part and the build chamber based on an orientation of the part relative to the recoater-recoater, wherein the controller further includes a logic module, wherein the logic module is configured to cause the controller to operate the system to perform the method of claim 1.

13. The system of claim 12, further comprising an imaging system configured to image the build chamber, wherein the imaging system is operatively connected to the controller to provide image data to the controller, wherein the controller is configured to control the rotational actuator to rotate the build chamber based at least in part on the image data.

14. A non-transitory computer readable medium having computer executable instructions stored therein, the computer executable instructions configured to cause a computer to control a system to perform the method of claim 1.

15. A method of additive manufacturing comprising:

selectively sintering at least a portion of a part and one or more indexing features onto a build plate disposed in a build area of a feedstock powder bed;

determining, using the one or more indexing features, an actual orientation of the part and the build plate relative to a recoater prior to recoating;

storing the actual orientation of the part and the build plate relative to the recoater in a memory;

comparing the actual orientation of the part and the build plate relative to the recoater with a predicted orientation of the part and the build plate relative to the recoater; and recoating the build area with feedstock powder when the actual orientation of the part and the build plate relative to the recoater matches the predicted orientation of the part and the build plate relative to the recoater or when a difference between the actual and predicted orientation of the part and the build plate relative to the recoater is within a predetermined error threshold to achieve a predetermined build quality for a respective layer of the part, wherein:

when the actual orientation of the part and the build plate relative to the recoater matches the predicted orientation of the part and the build plate relative to the recoater or a difference between the actual and predicted orientation of the part and the build plate relative to the recoater is within a predetermined error threshold:
   after recoating, selectively sintering a portion of the feedstock powder deposited by the recoater to the part; and when the actual orientation of the part and the build plate relative to the recoater does not match the predicted orientation of the part and the build plate relative to the recoater and the difference between the actual and predicted orientation of the part and the build plate relative to the recoater exceeds the error threshold:
   prior to recoating rotating the build plate and part together to change the orientation relative to the recoater such that the difference between the actual and the predicted orientation of the part and the build plate relative to the recoater is at least within the error threshold; and
selectively sintering the feedstock powder to the part after recoating the build area.

16. The method of claim 15, wherein:
a controller is operatively connected to control a rotational actuator to rotate the part and the build chamber based on an orientation of the part relative to the recoater.

17. The method of claim 15, wherein:
an imaging system images a build area before and after each rotation of the part to determine whether the orientation of the part and the build relative to the recoater is correct based at least in part on a relative location of the one or more indexing features.

\* \* \* \* \*